W. W. HOPKINS.
Wagon Scales.

No. 232,500.                       Patented Sept. 21, 1880.

WITNESSES:
W. W. Hollingsworth
Edw. W. Byrn

INVENTOR:
W. W. Hopkins
BY
ATTORNEYS.

UNITED STATES PATENT OFFICE.

WILLIAM W. HOPKINS, OF THORNTOWN, INDIANA.

WAGON-SCALE.

SPECIFICATION forming part of Letters Patent No. 232,500, dated September 21, 1880.

Application filed January 17, 1880.

*To all whom it may concern:*

Be it known that I, WM. W. HOPKINS, of Thorntown, Boone county, Indiana, have invented a new and useful Improvement in Wagon-Scales; and I do hereby declare the following to be a full, clear, and exact description of the same, reference being had to the accompanying drawings, forming a part of this specification, in which—

Figure 1:
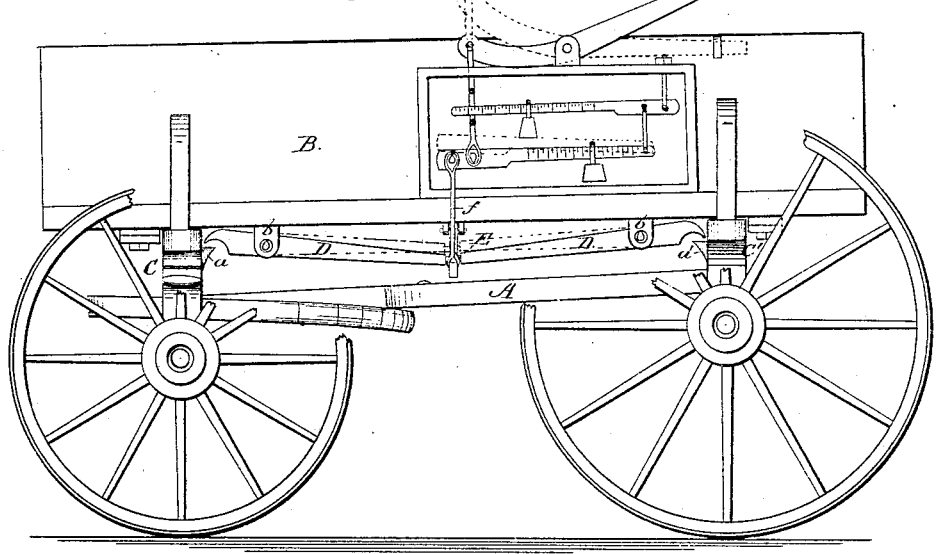
Figure 2:
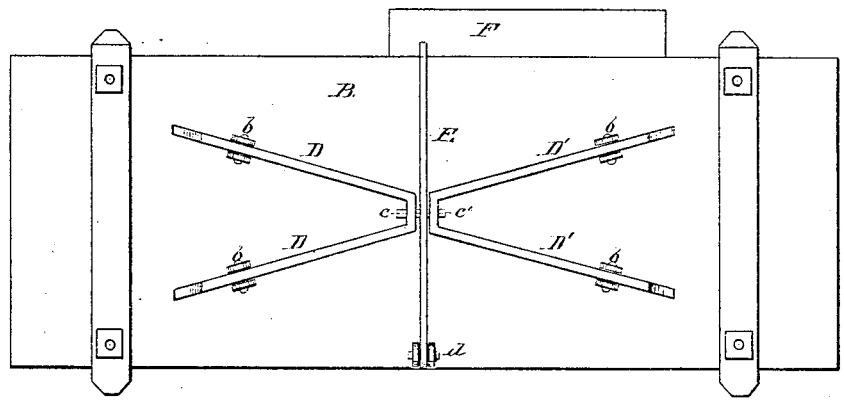

Figure 1 is a side elevation. Fig. 2 is an inverted plan view of the wagon-body.

The object of my invention is to enable farmers to have a convenient set of farm-scales for general use, and one adapted to weigh the contents of a wagon in bulk.

To this end it consists in the peculiar arrangement of a set of weighing-levers fastened to the bottom of the wagon-body, and adapted to bear against the bolster, in combination with a graduated scale-beam, also carried by the wagon-body, as hereinafter more fully described, and pointed out in the claim.

In the drawings, A represents the running-gear, and B the body portion, of any ordinary form of wagon. Upon the inner side of the two bolsters C C' are formed or attached seats *a a a' a'*, upon which are stepped the toes or hooked ends of four diverging weighing-levers, D D D' D'. These levers are connected in pairs at their inner ends, the two front levers, D D, being formed in the same piece and the two rear levers, D' D', in the same piece. These four levers have near their outer ends knife-edges, upon which the body of the wagon rests by means of the forked supports *b b b' b'*, which are attached to the bottom of the wagon-body and rest upon the knife-edge of the levers. The inner or converging ends of the two pairs of levers are perforated at the bend and made to bear upon the knife-edges *c c'* of a fifth transverse lever, E, which latter is fulcrumed at one end to the body of the wagon upon a knife-edge, *d*, and at its other end is connected by link-rod *f* to the scale-beam of the weighing device, located in a box, F, on one side of the wagon-body. These weighing devices may either be in the nature of a compound scale-beam, as shown, or a simple scale-beam with a lever attached for lifting the parts into weighing action.

In practice the scale-beam will be weighted with a poise representing the weight of the body of the wagon, so that the indications of the scale will always represent the net weight of the load.

In connecting the parts I may step the levers D D' either upon seats attached to the bolster, upon standards rising from the axle, or upon any other solid part of the running-gear.

In defining my invention more clearly, I would state that I am aware of the patent to Doane, granted January 22, 1861, in which a system of weighing-levers is carried by a special running-gear and the levers have toes that bear upwardly against the wagon-body. In my case it will be seen that the system of levers is carried by the wagon-body and the levers have toes that bear downward against the bolster or its equivalent, which arrangement adapts my device to the form of running-gear already in use, instead of requiring a special construction of running-gear.

I would also refer to the patent to Hartman, granted February 23, 1858, in which the weighing-levers are also carried by the thills of a cart, or parts which support the body, while the graduated beam is attached directly to the cart-body.

In my invention both the weighing-levers and the graduated beams are carried by the wagon-body, and when out of action the body and running-gear are entirely disconnected for perfect freedom of motion.

Having thus fully described my invention, what I claim is—

A pair of V-shaped or diverging levers permanently connected to the bottom of the wagon-body, and having toes adapted to rest upon the bolsters, combined with and connected to the cross-lever E, and with a graduated scale-beam, also hung upon the wagon-body, substantially as and for the purpose described.

The above specification of my invention signed my me this 27th day of December, 1879.

WM. W. HOPKINS.

Witnesses:
EDWD. W. BYRN,
SOLON C. KEMON.